(12) United States Patent
Nishiumi et al.

(10) Patent No.: US 6,453,379 B2
(45) Date of Patent: *Sep. 17, 2002

(54) INFORMATION PROCESSING SYSTEM AND TRUE/FALSE DETERMINING METHOD USED THEREFOR

(75) Inventors: Satoshi Nishiumi; Atsushi Watanabe; Takayuki Hashida, all of Kyoto (JP)

(73) Assignee: Nintendo Co, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/793,446

(22) Filed: Feb. 27, 2001

Related U.S. Application Data

(63) Continuation of application No. 09/587,499, filed on Jun. 6, 2000, now Pat. No. 6,230,232, which is a continuation of application No. 08/974,159, filed on Nov. 19, 1997, now Pat. No. 6,141,730.

(30) Foreign Application Priority Data

Nov. 21, 1996 (JP) ............................................. 8-327640

(51) Int. Cl.$^7$ .............................................. G06F 12/00
(52) U.S. Cl. ........................... 711/4; 711/100; 711/115; 711/154
(58) Field of Search ............................. 711/115, 4, 103, 711/150, 159, 5; 463/44, 1, 24, 29; 369/75.2, 77.2, 34, 291; 360/92

(56) References Cited

U.S. PATENT DOCUMENTS

| | | | |
|---|---|---|---|
| 5,182,687 A | * 1/1993 | Campbell et al. | 360/92 |
| 5,274,620 A | 12/1993 | Sipos | 369/77.2 |
| 5,599,231 A | * 2/1997 | Hibino et al. | 463/29 |
| 5,643,083 A | * 7/1997 | Hasegawa | 463/24 |
| 5,671,198 A | 9/1997 | Tsuchiya et al. | 369/34 |
| 5,778,421 A | 7/1998 | Nagano et al. | 711/115 |
| 5,781,367 A | 7/1998 | Searle et al. | 360/92 |
| 5,802,544 A | * 9/1998 | Combs et al. | 711/5 |
| 5,828,862 A | 10/1998 | Singkornrat et al. | 711/115 |
| 5,870,027 A | 2/1999 | Ho | 340/693.5 |
| 5,885,156 A | 3/1999 | Toyohara et al. | 463/1 |
| 5,914,929 A | 6/1999 | Kato et al. | 369/75.2 |
| 5,917,803 A | 6/1999 | Goto et al. | 369/291 |
| 5,923,641 A | 7/1999 | Fujita | 369/291 |
| 6,042,478 A | * 3/2000 | Ng | 463/44 |

FOREIGN PATENT DOCUMENTS

JP 4-303488 10/1992

* cited by examiner

*Primary Examiner*—David Hudspeth
*Assistant Examiner*—Fred F. Tzeng
(74) *Attorney, Agent, or Firm*—Nixon & Vanderhye P.C.

(57) ABSTRACT

A ROM cartridge 20 and a disk drive 30 are detachably attached to slots 103 and 104 of an information processing unit 10. A magnetic disk 40 is detachably attached to a slot 302 of the disk drive 30. A semiconductor storage device storing a game program and data is provided inside of the ROM cartridge 20. The information processing unit 10 detects whether the ROM cartridge 20 is attached to the slot 103 and whether the disk drive 30 is attached to the slot 104. Then the information processing unit 10 performs predetermined information processing on a basis of program data stored in the ROM cartridge 20 or the disk drive 30 when detecting that the ROM cartridge 20 or the disk drive 30 is attached to the slot 103 or 104, and starts information processing on the basis of the program data stored in the ROM cartridge 20 when detecting that both of the ROM cartridge 20 and the disk drive 30 are attached to the slots 103 and 104.

12 Claims, 10 Drawing Sheets

INFORMATION PROCESSING SYSTEM AND TRUE/FALSE DETERMINING METHOD USED THEREFOR

This is a continuation of application Ser. No. 09/587,499, filed Jun. 6, 2000, now U.S. Pat. No. 6,230,232 which is a continuation of Ser. No. 08/974,159, filed Nov. 19, 1997 now U.S. Pat. No. 6,141,730 the entire content of which is hereby incorporated by reference in this application.

FIELD OF THE INVENTION

The present invention relates to information processing systems and authorization determining methods used therefor. More specifically, the invention relates to an information processing system using a plurality kinds of storage media and storage media authorization determining method.

BACKGROUND AND SUMMARY OF THE INVENTION

One example of an information processing system using two kinds of storage media is disclosed in the Japanese Patent Laying-Open No. 4-303488 filed by the present applicant. The conventional art stores program data in a cartridge and stores other data in a CD-ROM which is read based upon a program in the cartridge.

The above-mentioned prior art has a problem that information processing can not be performed unless the cartridge is inserted.

Therefore, a feature of the illustrative embodiments is to provide an information processing system having high flexibility, which can perform data processing according to connection conditions of storage media at all times.

Also, another feature of the illustrative embodiments is to provide a true/false determining method capable of recognizing whether a storage medium to be operated is true or false.

The illustrative embodiments have the following characteristics to attain the above features.

A first feature of the exemplary embodiments is an information processing system comprising at least two different kinds of storage devices and an information processing unit having at least a first slot and a second slot for attaching each of the storage devices thereto individually, wherein The storage devices includes at least:
  a first store inserted in the first slot to store data including program data, image data and/or audio data in digital form; and
  a second store, in which data is stored in a different way from the first store inserted in the second slot to store data including program data, image data and/or audio in digital form,
  the information processing unit includes:
    a detector for detecting whether the first store is attached to the first slot and whether the second store is attached to the second slot; and
    a processor, and
  the processor:
    performs predetermined information processing based on the program data stored in the first store or the second store which is inserted in the first slot or the second slot respectively when the detector detects that the first store or the second store is inserted to the first slot or the second slot; and
    starts information processing based on the program data stored in the first store when said detector detects that the first and the second store are inserted to the first and the second slots.

As described in the above, according to the first aspect, it is possible to start-up the information processing system freely from various storage media, when enables production of diverse software.

A second feature of the exemplary embodiments is that, in the first feature,
  the first store includes a first responder generating a first response signal,
  the second store includes a second responder generating a second response signal, and
  the detector detects whether the first store is attached to the first slot and whether the second store is attached to the second slot, based on the first response signal from the first responder and the second response signal from the second responder.

As described in the above, according to the second feature, the information processing system detects the response signals, not simply detecting that something is attached to the slot, which makes it possible to more certainly confirm whether the store is attached.

A third feature of the exemplary embodiments is that, in the second feature,
  the first response signal includes a first priority information indicating that the first response signal has relatively high priority,
  the second response signal includes a second priority information indicating that the second response signal has relatively low priority, and
  the detector detects that the first responder has higher priority over the second responder, based on the first and second priority information to activate the first store prior to the second store.

As described above, according to the third feature, since the priority order is not fixed but decided by the priority information and thereby the storage medium to be started can be freely changed, production of diverse software can be realized.

A fourth feature of the exemplary embodiments is that, in the first feature,
  the first store includes a semiconductor storage device, access time of which is relatively fast,
  the second storing means includes a disk-like storage medium and a disk drive, access time of which is relatively slow, and
  the processor starts the processing based upon the data in the first store which operates at high speed when the detector detects that the first store and the second store are inserted in the first slot and the second slot, respectively.

As described in the above, according to the fourth feature, judging the connecting condition of the first store and the second store and giving priority to the first store having the high speed storage device enables the information processing system to realize uniformity, labor-saving and high-speed at the time of start-up.

A first feature of the illustrative embodiments is that, in the fourth feature,
  a plurality of disk-like storage media are used by being exchanged alternatively in the second store,
  each of the disk-like storage media has a usage order data storage area storing data which indicates a usage order, and the processor judges whether the disk-like storage medium to be used next has a proper usage order, based on the order data stored in each of the disk-like storage media and performs the information processing based on the data stored in the disk-like storage medium only in the case that the disk-like storage medium has the proper usage order.

As described in the above, according to the fifth feature, since the usage order is set in each of the disk-like storage media, it is possible to prevent a disk from being operated with a wrong order and prevent the wrong data from being written in.

A sixth feature of the exemplary embodiments is that, in the fourth feature, the semiconductor storage device has a first security data storage area storing first security data, the disk-like storage medium has a second security-data storage area storing second security data, the disk drive includes a third store storing third security data, and the processor, when the detector detects that the first store and second store are inserted in the first and the second slot respectively, compares the first and third security data, and only when finding that the first and third security data have a predetermined relationship, processes the data stored in the disk-like storage medium.

As described in the above, according to the sixth feature, it is recognized during each of the operations whether the device to be operated is authentic or not, thereby making it possible to realize sufficient security.

A seventh feature of exemplary embodiments is that, in the first feature, the processor starts the information processing on the basis of the data stored in the first store and performs the information processing on the basis of the data stored in the second store as required.

As described in the above, according to the seventh feature, the data stored in the first store and the second store can be freely processed alternately, which enables the production of diverse software.

An eight feature of the exemplary embodiments is an information processing system comprising a first storage medium, a second storage medium and an information processing unit operating on a basis of data stored in the first and/or the second storage medium, wherein the first storage medium includes:
    a program storage area storing a program for information processing;
    a first ID data storage area storing first ID data for the first storage medium; and
    a first arbitrary data storage area capable of storing arbitrary data, the second storage medium includes:
    a data storage area storing predetermined data for information processing;
    a second ID data storage area storing second ID data for the second storage medium; and
    a second arbitrary data storage area capable of storing arbitrary data, and the information processing unit:
        writes the first ID data stored in the first storage medium into the second arbitrary data storage area of the second storage medium, and/or writes the second ID data stored in the second storage medium into the first arbitrary data storage area of the first storage medium before using the data stored in the second storage medium for a first time; and
        when performing the information processing according to the program stored in the first storage medium and the predetermined data stored in the second storage medium and then using the data stored in the second storage medium again, detects whether the second ID data is stored in the first arbitrary data storage area of the first storage medium and/or whether the first ID data is stored in the second arbitrary data storage area of the second storage medium before using the data stored in the second storage medium, and only when detecting that the second ID data is stored in the first arbitrary data storage area of the first storage medium and/or that the first ID data is stored in the second arbitrary data storage area of the second storage medium, can process the data stored in the data storage area of the second storage medium.

As described in the above, according to the eighth feature, by using the common ID information areas, it is possible to realize uniformity of control in use and security.

A ninth feature of the exemplary embodiments is that, in the eighth feature, the first and second storage media are disk-like storage media.

As described in the above, according to the ninth feature, even the disk, which has difficulty in achieving security, security can be effectively realized.

A tenth feature of the exemplary embodiments is that, in the eighth feature, the first storage medium is a semiconductor memory and the second storage medium is a disk-like storage medium.

As described in the above, according to the tenth feature, effective security can be realized even by a combination of different storage media.

An eleventh feature of the exemplary embodiments is a memory authorization determining method used for an information processing system which comprises a first storage medium including a program storage area storing a program for information processing, a first ID data storage area storing first ID data and a first arbitrary data storage area capable of storing arbitrary data, a second storage medium including a data storage area storing predetermined data for information processing, second ID data storage area storing second ID data and a second arbitrary data storage area capable of storing arbitrary data, and an information processing unit operating based on data stored in the first storage medium and/or the second storage medium, wherein the true/false determining method:
    before using the data stored in the second storage medium for a first time, writes the first ID data stored in the first storage medium into the second arbitrary data storage area of the second storage medium and/or writes the second ID data stored in the second storage medium into the first arbitrary data storage area of the first storage medium; and
    when performing information processing according to the program stored in the first storage medium and the predetermined data stored in the second storage medium and then using the data stored in the second storage medium again, detects whether the second ID data is stored in the first arbitrary data storage area of the first storage medium and/or whether the first ID data is stored in the second arbitrary data storage area of the second storage medium before using the data stored in the second storage medium, only when detecting that the second ID data is stored in the first arbitrary data storage area of the first storage medium and/or that the first ID data is stored in the second arbitrary data storage area of the second storage medium, can process the data stored in the data storage area of the second storage medium.

As described in the above, according to the eleventh feature, by using the common ID information areas, uniformity of control in use and security can be realized.

A twelfth feature of the exemplary embodiments is a game machine system comprising a slot for inserting a cartridge which includes a semiconductor memory storing data and a slot for inserting a disk-like storage medium which stores data and which:

- automatically starts a game program stored in the cartridge when only the cartridge is inserted;
- automatically starts the game program in the cartridge when both of the cartridge and the disk-like storage medium are inserted;
- automatically starts a game program stored in the disk-like storage medium when only the disk-like storage medium is inserted; and
- can process the data stored in both of the cartridge and the disk-like storage medium when starting the game program stored in the cartridge.

As described in the above, according to the twelfth feature, the connecting condition of the cartridge and the disk is determined and the cartridge is given priority, whereby making it possible to realize uniformity, labor-saving and high-speed at the time of start-up, and a variety of games.

A thirteenth feature of the exemplary embodiments is a game machine system capable of managing a plurality of disk-like storage media by providing a common ID information area in each of the disk-like storage media in order to automatically recognize attributes of the disk-like storage media, recording information, which is necessary for the recognition, in the ID information area to make the ID information areas common among the disk-like storage media and executing same processing to all of the disk-like storage media.

As described in the above, in the thirteenth feature, by using the common ID information areas, it is possible to realize uniformity of control in use and security.

A fourteenth feature of the exemplary embodiments is that, in the thirteenth feature, information for recognizing which number of disk-like storage medium the present disk-like storage medium is among the plurality of disk-like storage media composing a group is recorded in the ID information area.

As described in the above, according to the fourteenth feature, since the order is set in each of the disks, it is possible to prevent a disk from being operated in the wrong order and prevent the wrong data from being written therein.

A fifteenth feature of the exemplary embodiments is that, in the thirteenth feature, the game machine system discriminates a disk-like storage medium belonging to a prescribed group from a disk-like storage medium belonging to another group by writing specific ID information in each of the plurality of disk-like storage media composing the prescribed group.

As described in the above, according to the fifteenth aspect, by using the common ID information areas, it is possible to realize uniformity of control in use and security.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
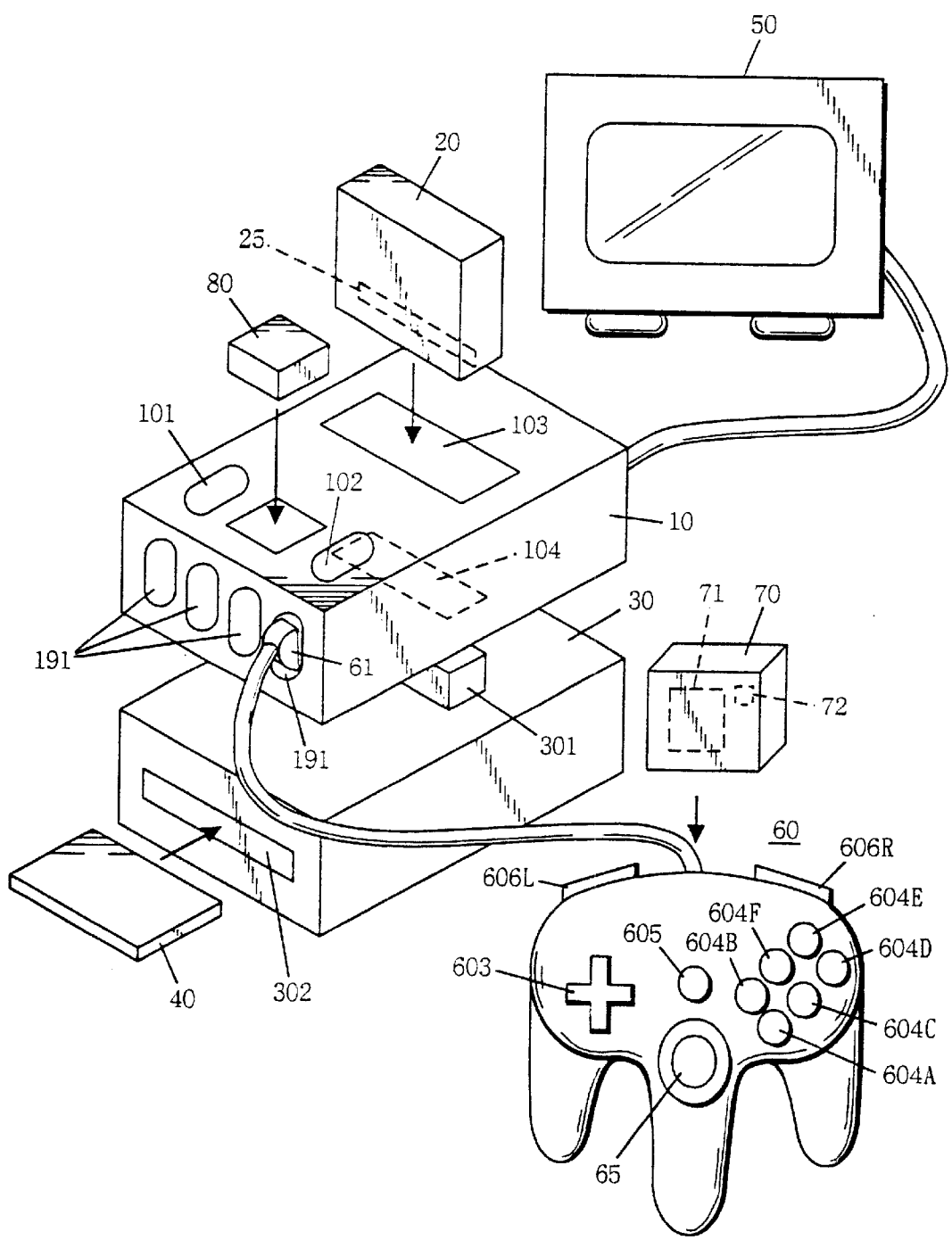
FIG. 1 is an external view showing a structure of an information processing system according to an embodiment of the present invention.

FIG. 1 is an external view showing a structure of an information processing system according to an embodiment of the present invention. In FIG. 1, the information processing system of the present embodiment is a video game system, for example and includes an information processing unit 10 which composes the game machine body, a ROM cartridge 20 which is an example of an external storage device, a disk drive 30 and a magnetic disk 40 which are examples of the external storage devices, a display 50 which is an example of a displaying means connected to the information processing unit 10, a controller which is an example of a controlling means, a RAM cartridge 70 which is an example of an extended device detachably attached to the controller 60 and an extended RAM 80.

The information processing unit 10 is provided with a power switch 101, a reset switch 102, a slot 103 for inserting the ROM cartridge 20 therein, a slot 104 for inserting a connector 301 of the disk drive 30 therein and a connector 191. A connector 13 and a connector 14 are provided in the slot 103 and the slot 104 respectively as shown in FIG. 2 described later, and are electrically connected to internal circuits of the information processing unit 10.

A connector 25 is provided in the ROM cartridge 20. The connector 25 is connected to the connector 13 by the ROM cartridge 20 being inserted in the slot 103.

The disk drive 30 is provided with the connector 301 and a slot 302. The connector 301 is connected to the connector 14 by being inserted in the slot 104. The slot 302 is a slot in which the magnetic disk 40 is inserted. Although the present embodiment has only one slot for inserting a magnetic disk therein, the present invention may be composed so that a plurality of magnetic disks can be inserted and data stored in the different magnetic disks are sequentially read or data is written in the magnetic disks. The magnetic disk 40 is a storage medium capable of magnetically reading and writing data.

Figure 2:
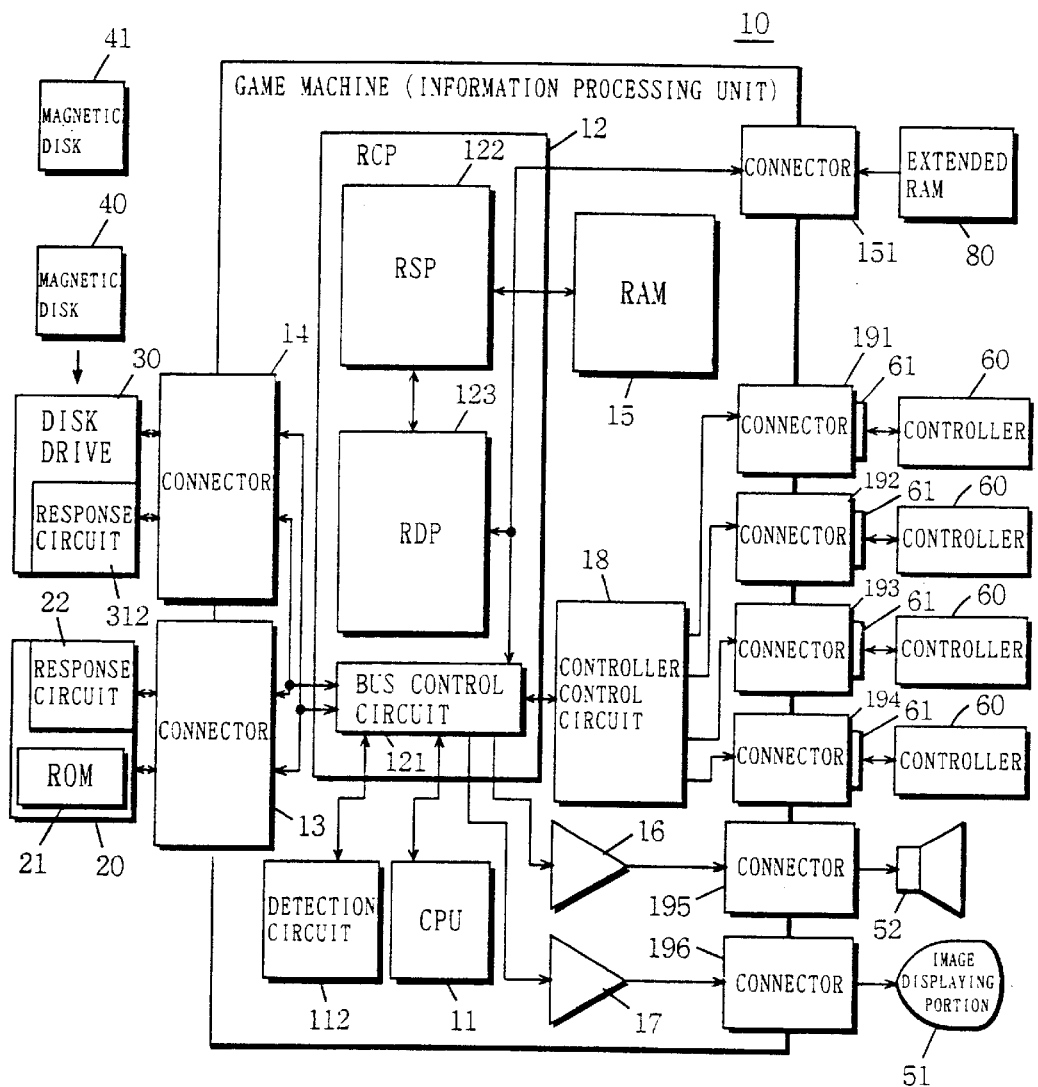
FIG. 2 is a block diagram showing the structure of the information processing system according to the embodiment of the present invention in detail.

The display 50, as shown in FIG. 2 described later, is an image displaying unit including an image displaying portion 51 and an audio outputting unit 52.

The controller 60 includes switches 603, 604A–604F, 605, 606L and 606R, a joy stick 65 and a connecting portion for connecting the RAM cartridge 70 thereto, and outputs controller data (including control data of the switches and the joy stick and data stored in the RAM cartridge 70) to the information processing unit 10.

The RAM cartridge 70 incorporates a RAM 71 whose capacity is less than or equal to a half of maximum memory capacity accessible through an address bus and is composed of 256 k bit RAM, for example. The RAM 71 stores backup data relating to a game and holds the stored data by being powered through a battery 72 even in the case where the RAM cartridge 70 is disconnected from the controller 60.

The extended RAM 80 is provided with a RAM therein and extends storage areas that are accessible by a CPU.

The external storage device stores audio data such as music, sound effects as well as image data and program data for information processing for a game or the like, and may be a floppy disk, a PD, a jip, a CD-ROM, a CD-R, a MO and a DVD instead of the ROM cartridge and the magnetic disk. In the case where the information processing system of the present invention is realized by a personal computer, an input unit such as a keyboard and a mouse is used as a controlling means.

FIG. 2 is a block diagram showing the structure of the information processing system according to the embodiment of the present invention in detail. In FIG. 2, the information processing unit 10 incorporates a central processing unit (abbreviated as "CPU" hereinafter) 11 and a coprocessor (a reality media coprocessor: abbreviated as "RCP" hereinafter) 12.

The RCP 12 includes an image processing unit (a reality signal processor: abbreviated as "RSP" hereinafter) 122 performing coordinate transformation of polygons, lighting processing and so on, an image processing unit (a reality display processor: abbreviated as "RDP" hereinafter) 123 rasterizing polygon data to an image to be displayed and converting the data into a data format which can be stored in a frame memory, and a bus control circuit 121 controlling buses. Also, RCP 12 is connected to the connector 13 for cartridge for detachably attaching the ROM cartridge 20 thereto, the connector 14 for disk drive for detachably attaching the disk drive 30 thereto, a RAM 15 and the extended RAM 80 through a connector 151. (A memory map of the RAM 15 will be described in detail below.) Further, to the RCP 12 are connected an audio signal generation circuit 16 for outputting an audio signal processed by the CPU 11, an image signal generation circuit 17 for outputting an image signal processed by the CPU 11 and a controller control circuit 18 for serially transferring control data of one or a plurality of the controllers 60 and/or data of the RAM cartridge 70. Moreover, the RCP 12 is connected to a detection circuit 112 which detects whether the ROM cartridge 20 is connected to the connector 13 or not and/or whether the disk drive 30 is connected to the connector 14 or not.

A connector 195 provided on a back surface of the information processing unit 10 is connected to the audio signal generation circuit 16. A connector 196 provided on the back surface of the information processing unit 10 is connected to the image signal generation circuit 17. A connecting portion of the audio outputting unit 52 such as a speaker of a television set is detachably connected to the connector 195. A connecting portion of the image displaying portion 51 such as a CRT of a television set is detachably connected to the connector 196. In FIG. 2, though the connector 195 and the connector 196 are illustrated separately, it may be possible to provide separate connection lines and only one connector.

Connectors 191–194 (abbreviated as "connectors" hereinafter) for controllers 60 provided on a front surface of the information processing unit 10 are connected to the controller control circuit 18. The controllers 60 are detachably connected to the connectors 191–194 through a jack 61 for connection. In this way, by connecting the controllers 60 to the connectors 191–194, a controller 60 is electrically connected to the information processing unit 10 to enable transmission and reception of data between the controller 60 and the information processing unit 10.

The ROM cartridge 20 packages a ROM 21 which stores data for game processing and a response circuit 22 on a substrate, and accommodates the substrate in a housing. The response circuit 22 is a signal generation circuit which generates a response signal including priority data for the detection circuit 112. Also, the response circuit 22 is formed by short-circuiting two terminals provided on the substrates and may be formed by short-circuiting terminals in the connector 13 as a result that the ROM cartridge 20 is attached to the connector 13 and may detect that the ROM cartridge 20 is properly connected to the connector 13. Further, the response circuit 22 is a sensor like photo interrupter or a mechanical switch and may be a circuit which generates a signal when the ROM cartridge 20 is properly connected to the connector 13.

Figure 3:
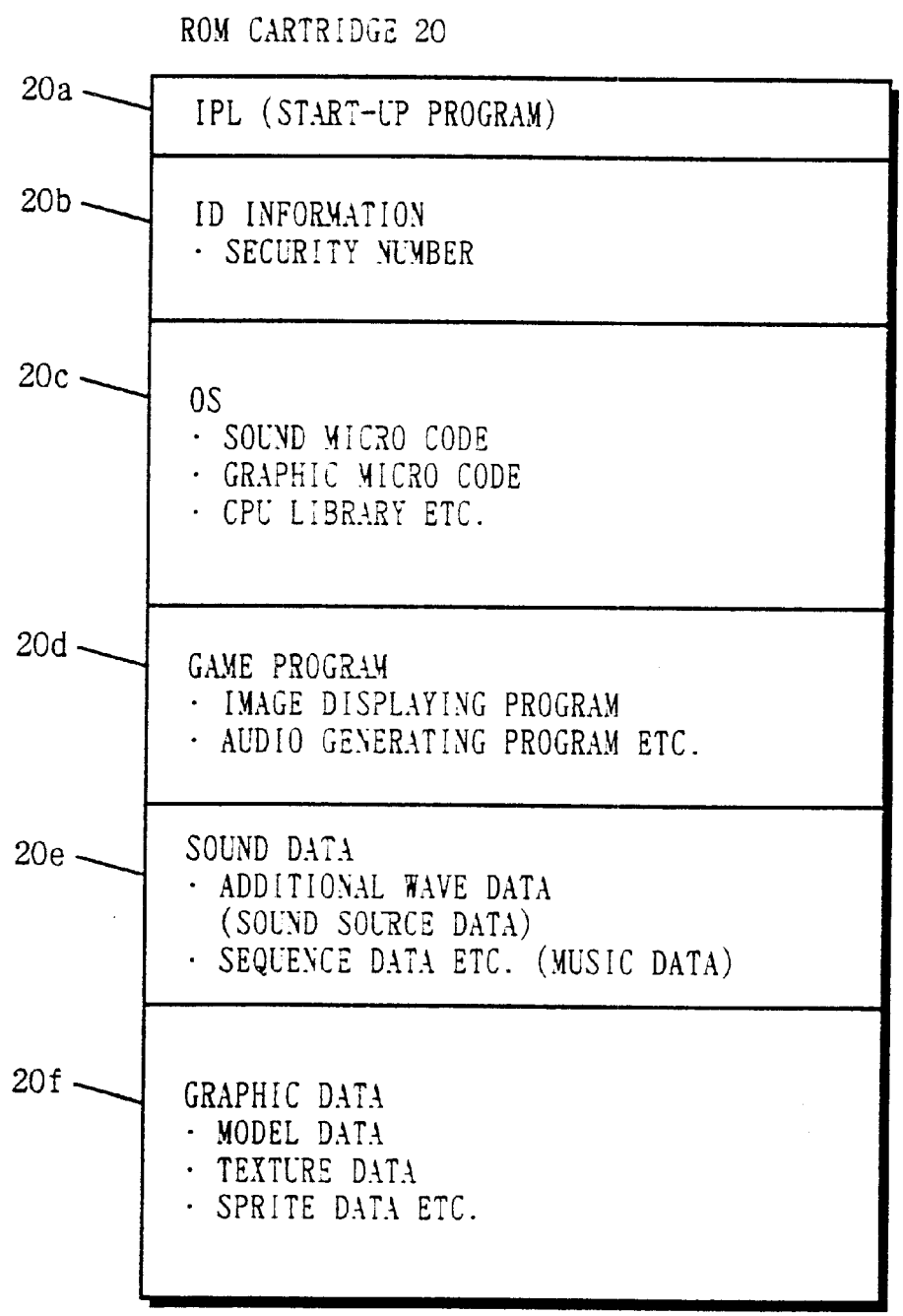
FIG. 3 is a memory map showing memory areas of a ROM 21 of a ROM cartridge 20.

As shown in FIG. 3, the ROM 21 in the ROM cartridge 20 includes a start-up program storage area 20*a*, an ID information storage area 20*b*, an OS storage area 20*c*, a program storage area 20*d*, a sound data storage area 20*e* and a graphic data storage area 20*f*.

The start-up program storage area 20*a* is an area for storing a program for an IPL (initial program loader) which is executed at first before the CPU 11 executes other program processing.

The ID information storage area 20*b* is an area that stores a security number indicating that the ROM cartridge 20 is an authentic cartridge.

The OS storage area 20*c* is a storage area for storing a program which is used as an OS (operating system) and includes a storage area which stores a sound micro code, a graphic micro code, a CPU library and the like. The sound micro code is a program which is loaded into the RSP 122 to enable the RSP 122 to perform sound processing. The graphic micro code is a program which is loaded into the RSP 122 to enable the RSP 122 to perform graphics processing. The CPU library is a group of many sub-routine programs for the CPU 11 to perform predetermined operations.

The program storage area 20*d* is an area that stores programs which the CPU 11 should process and include an image displaying program, an audio generating program, a security number comparing program, a game processing program, a magnetic disk data reading program, a data transferring program, a controller data reading program, a micro code writing program, a serial number reading program, a serial number writing program, a font data reading program, a RAM area detecting program, a RAM area setting program and the like.

The sound data storage area 20e is a storage area to store wave data, sequence data and the like.

The wave data is sound source data representing waveforms of sounds. The sequence data represents music data representing melodies of music and so forth.

The graphic data storage area 20f stores model data, texture data, sprite data and the like. The model data includes coordinate data of an object which is composed of polygons, and others. The texture data includes color data representing patterns and textures for being pasted to the polygons, and others. The sprite data includes coordinate data of an object which is drawn in a horizontal plane and color data.

The disk drive 30 is a device for reading data from a disk-like storage medium which stores data to be stored in an external ROM (a disk-like storage medium which is magnetic, optical or the like: for example, a floppy disk, a PD, a jip, a CD-ROM, a CD-R, a MO, a DVD or the like). In the present embodiment, an example using a writable magnetic disk is described.

Figure 4:
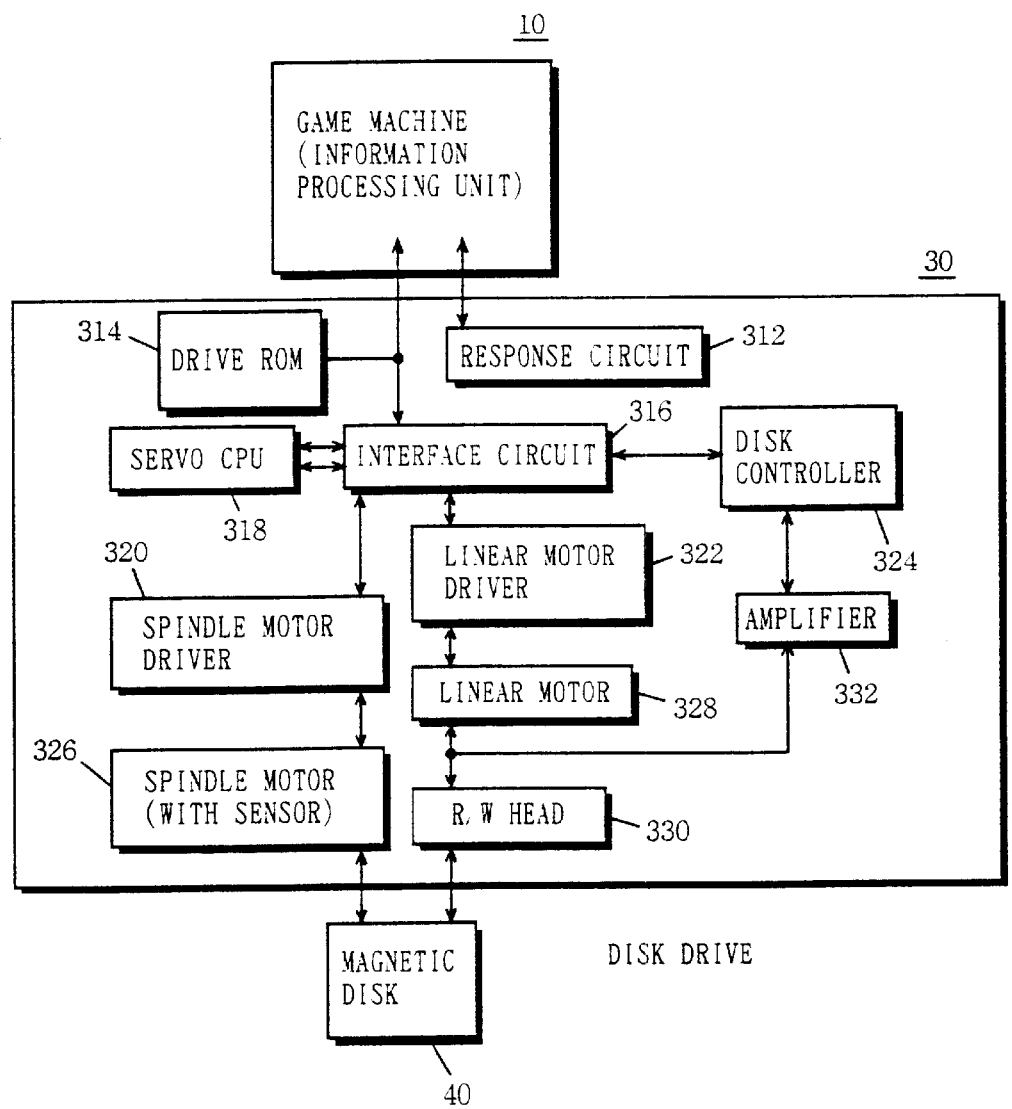
FIG. 4 is a detailed block diagram of a disk drive 30.

FIG. 4 is a block diagram of the disk drive 30 in further detail. In FIG. 4, the disk drive 30 has a connector and is electrically connected to the information processing unit 10 by the connector being connected to the connector 14 provided in the slot of the information processing unit 10.

After the disk drive 30 and the information processing unit 10 are electrically connected, a response circuit 312, a drive ROM 314 and an interface circuit 316 are connected to the bus control circuit 121 included in the information processing unit 10. The response circuit 312 is connected to the detection circuit 112 through the bus control circuit 121 and generates a response signal in response to a signal from the detection circuit 112. The detection circuit 112 detects a connecting condition of the disk drive 30 by detecting the response signal. The drive ROM 314 stores a start-up program of the disk drive 30 and is accessed by the CPU 11 through the bus control circuit 121.

Figure 5:
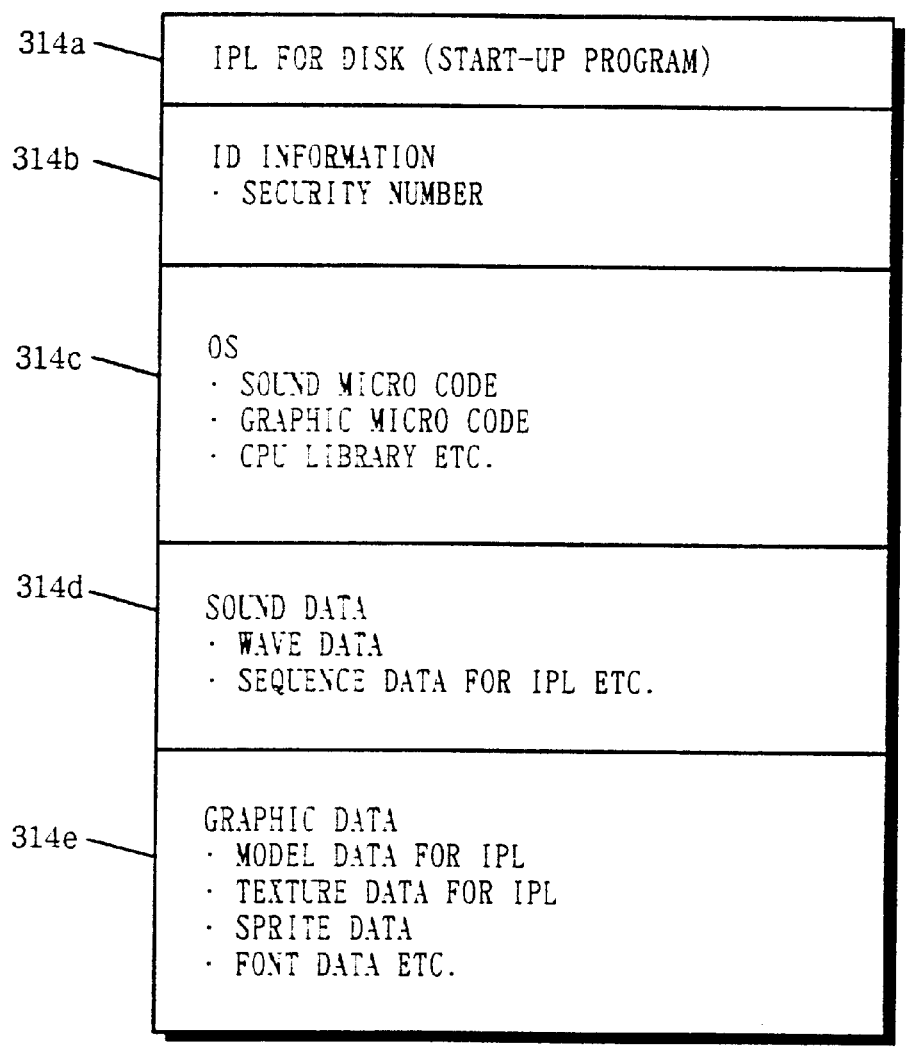
FIG. 5 is a memory map showing memory areas of a drive ROM 314.

FIG. 5 is a memory map of the drive ROM 314. In FIG. 5, the drive ROM 314 includes a start-up program storage area 314a, an ID information storage area 314b, an OS storage area 314c, a sound data storage area 314d and a graphic data storage area 314e. The start-up program storage area 314a is an area to store a program for an IPL which is executed first before the CPU 11 executes the program processing. The ID information storage area 314b is an area that stores a security number indicating that the magnetic disk 40 is an authentic disk. The OS storage area 314c is an area for storing a program which is used as an OS (operating system) and stores a sound micro code, a graphic micro code and a CPU library and so forth. The sound data storage area 314d is a storage area to store wave data, sequence data and the like. The graphic data storage area 314e is a storage area to store model data, texture data, sprite data, font data and the like. The font data is graphic data representing fonts of characters, symbols and so on.

The interface circuit 316 is an interface circuit for connecting the bus control circuit 121, a servo CPU 318, a spindle motor driver 320, a linear motor driver 322 and a disk controller 324 through buses.

The servo CPU 318 outputs instructions to the spindle motor driver 320, the linear motor driver 322 and the disk controller 324 according to an instruction from the CPU 11, thereby the servo CPU 318 can control each of the devices.

The spindle motor driver 320 is connected to a spindle motor 326 and controls spin of the spindle motor 326. The spindle motor 326 is a motor to spin the magnetic disk 40. The spindle motor 326 has a sensor for determining a position of the magnetic disk 40, making it possible to detect a current position of the magnetic disk precisely.

The linear motor driver 322 is connected to a linear motor 328 and controls a drive of the linear motor 328. The linear motor 328 is a motor to make a R/W head 330 operate. The R/W head 330 reads and writes data from/in the magnetic disk 40.

The disk controller 324 outputs a RAN signal (a read signal and a write signal) to the R/W head 330. An amplifier 332 amplifies the R/W signal to output the signal to the R/W head 330. When the amplified signal is a read signal, the R/W head 330 reads data from the disk and when the amplified signal is a write signal, the R/W head 330 writes data in the disk.

Figure 6:
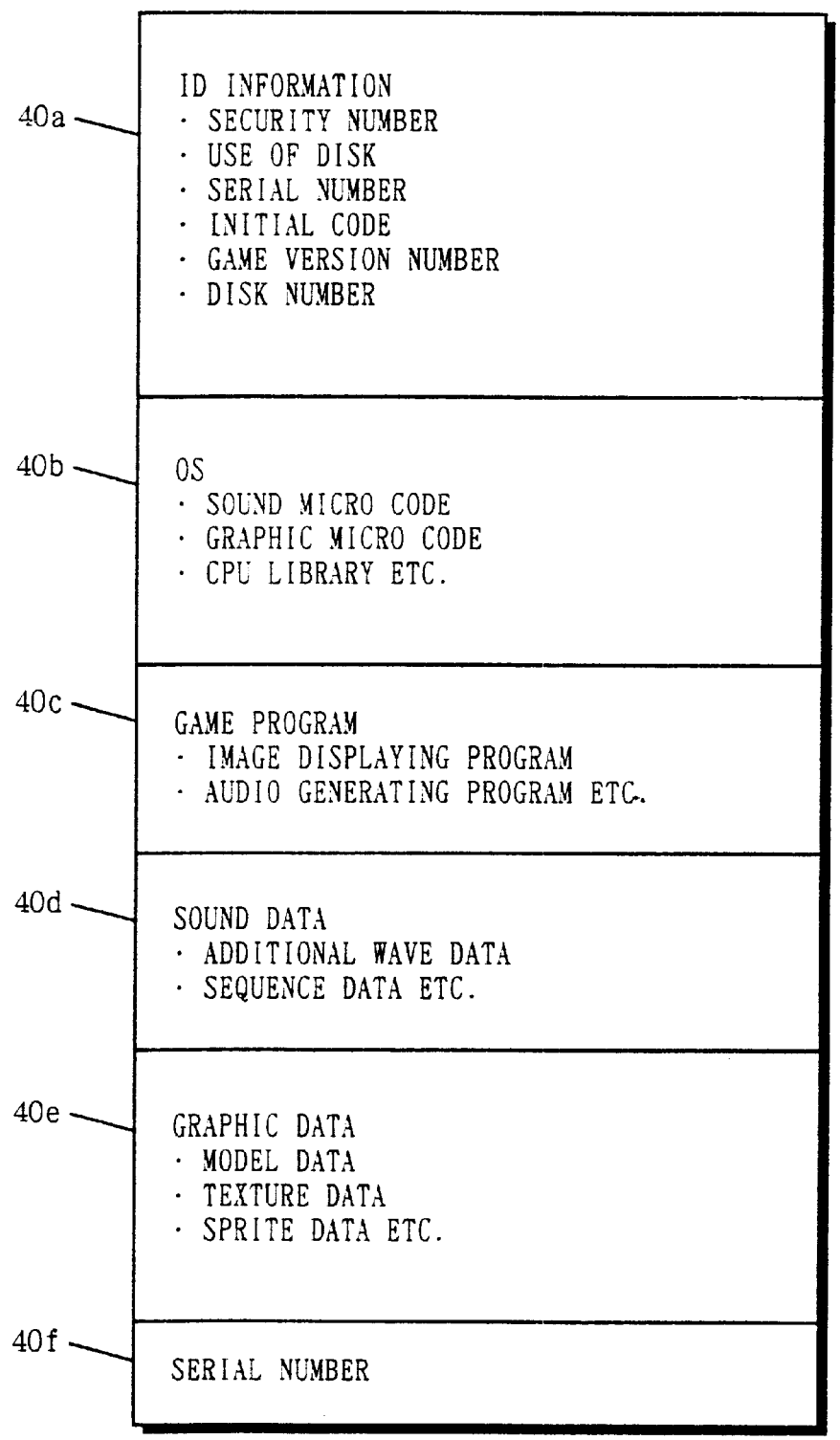
FIG. 6 is a memory map showing memory areas of a magnetic disk 40.

FIG. 6 is a memory map of the magnetic disk 40. In FIG. 6, the magnetic disk 40 includes an ID information storage area 40a, an OS (operating system) storage area 40b, a program storage area 40c, a sound data storage area 40d, a graphic data storage area 40e and a serial number storage area 40f.

The ID information storage area 40a includes an area which stores a security number, a use of the disk, a serial number, an initial code, a version number and a disk number. The security number indicates that the magnetic disk 40 is an authentic disk. The use of the disk is code data representing the use of the magnetic disk 40. For example, the use of the disk represents a magnetic disk storing a program when the code is 0, a magnetic disk storing data such as game data, image data and audio data when the code is 1 and a magnetic disk for general purpose use which does not especially specify a use when the code is 2. The serial number is a peculiar number different from magnetic disk to magnetic disk. The initial code is code data representing a name of a program stored in the magnetic disk 40. The version number is code data representing a version at a time of mass production. The disk number is code data representing which number of disk the present disk is when a plurality of magnetic disks are used to execute the program.

The OS storage area 40b is a storage area for storing a program used as an OS (operating system) and stores a sound micro code, a graphic micro code, a CPU library and so on.

The program storage area 40c is an area that stores programs to be processed by the CPU 11 and the program includes an image displaying program, an audio generating program, a security number comparing program, a game processing program, a magnetic disk data reading program, a data transferring program, a controller data reading program, a micro code writing program, a serial number reading program, a serial number writing program, a serial number reading program, a font data reading program, a RAM area detecting program, a RAM area setting program, and so forth.

The sound data storage area 40d is a storage area to store wave data, sequence data and the like.

The graphic data storage area 40e is a storage area to store model data, texture data, sprite data and the like.

The serial number storage area 40f is an area to store serial numbers stored in ID information storage areas of other magnetic disks.

A memory map of another magnetic disk 41 which will be described later is the same as the memory map of the magnetic disk 40. Particularly, setting an address of the ID information storage area same as an address of the serial number storage area makes it easier to compare the serial numbers of the magnetic disks.

Next, data flow on buses will be described. The bus control circuit 121 in the RCP 12 inputs a command which is output as a parallel signal from the CPU 11 through a bus, converts the command from parallel to serial to output the command as a serial signal to the controller control circuit 18, converts data of the serial signal input from the controller control circuit 18 to a parallel signal to output the parallel signal to buses. The bus control circuit 121 in the RCP 12 controls transmission and reception of an address signal and a data signal between the CPU 11 and the ROM cartridge 20 and between the disk drive 30 and the extended RAM 80. Thus, the data output by the bus control circuit 121 in the RCP 12 is processed by the CPU 11 or stored in the RAM 15, for example. The RAM 15 stores the data output to the buses and the CPU 11, the RSP 122 or the RDP 123 performs write processing / read processing of the RAM 15.

Figure 7:
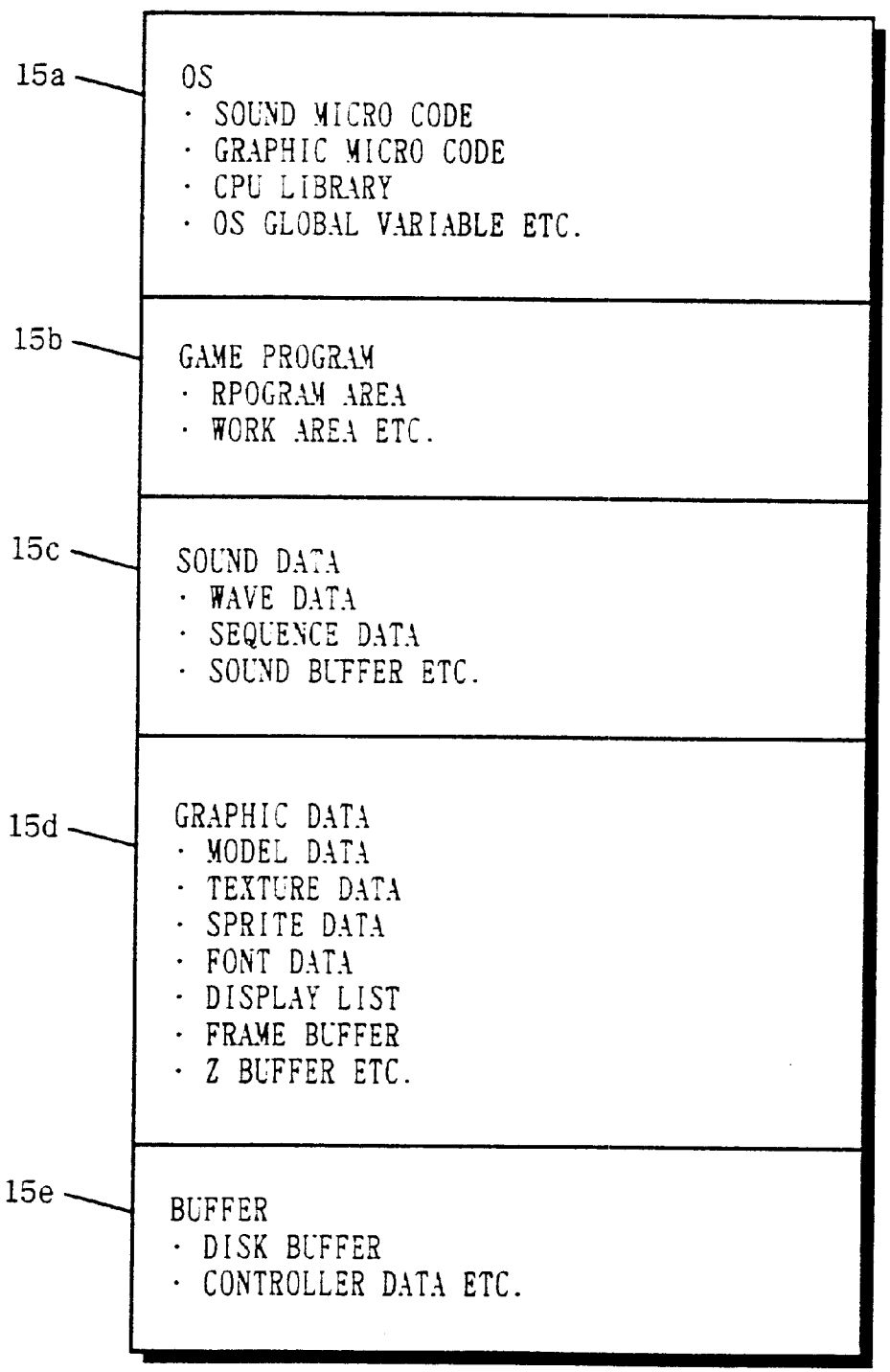
FIG. 7 is a memory map showing memory areas of a RAM 15.

FIG. 7 is a memory map illustrating areas of memories of the RAM 15. In FIG. 7, memory areas which are accessible by the CPU 11 through the bus control circuit 121 and/or memory areas of the RAM 15 which are directly accessible by the RCP 12 include an OS storage area 15a, a program storage area 15b, a sound data storage area 15c, a graphic data storage area 15d and a buffer area 15e.

The OS storage area 15a is an area for temporarily storing data stored in the OS storage areas of the magnetic disk 40 and the drive ROM 314, stores a sound micro code, a graphic micro code and a CPU library and includes an OS variable storage area which stores variables generated at the time of executing the OS.

The program storage area 15b is an area for temporarily storing data stored in the program storage areas of the ROM 21 and the magnetic disk 40, stores a program and includes a work area for storing variables generated at the time of executing the program.

The sound data storage area 15c is an area for temporarily storing data stored in the sound data storage areas of the magnetic disk 40 and the drive ROM 314, stores wave data and sequence data and includes a sound buffer area used to temporarily store sound data when generating the sound data.

The graphic data storage area 15d is an area for temporarily storing data stored in the graphic data storage area in the ROM 21, the magnetic disk 40 and the drive ROM 314, stores model data, texture data, sprite data and font data, further stores a display list and includes a frame buffer area and a Z buffer area. The display list is a list of kinds and positions of polygons to be information processed. The frame buffer area corresponds to an image to be displayed on the image displaying portion 51 and is an area for storing color data for each dot of an image created by the RSP 122 and the RDP 123 in the RCP 12. The Z buffer area corresponds to the color data stored in the above-mentioned frame buffer area and is an area for storing depth data for each dot of an image created by the RSP 122 and the RDP 123 in the RCP 12.

The buffer area 15e includes a disk buffer area and a controller data storage area. The disk buffer area is an area for temporarily storing data stored in the magnetic disk 40 when the data is transferred. The controller data storage area is a storage area for storing controller data transmitted from the controller 60. The controller data includes data indicating whether the switch 603, 604A–604F, 605, 606L and 606R are pushed or not, joy stick data indicating amount of tilt toward a X axis and a Y axis of the joy stick 65 and data transmitted from electric devices (for example, a RAM, a vibrator, an indicator, a temperature sensor and a humidity sensor) in the RAM cartridge 70.

Next, an operation of the information processing system of the present embodiment will be briefly explained.

(1) The case where the ROM cartridge 20 is connected to the connector 13 and the disk drive 30 is not connected to the connector 14;

When the power switch 101 is pushed, the detection circuit 112 instructs each of the response circuits to generate a response signal. While the response circuit 22 outputs a response signal to the detection circuit 112, the response circuit 312 can not output a response signal since the response circuit 312 is not connected to the connector 14. Therefore, the detection circuit 112 detects that the cartridge is connected to the connector 13 and makes the CPU 11 accessible to the ROM 21. The CPU 11 executes the start-up program stored in the ROM 21.

(2) The case where the ROM cartridge 20 is not connected to the connector 13 and the disk drive 30 is connected to the connector 14;

When the power switch 101 is pushed, the detection circuit 112 instructs each of the response circuits to generate a response signal. While the response circuit 312 outputs the response signal to the detection circuit 112, the response circuit 22 can not output a response signal since the response circuit 22 is not connected to the connector 13. Therefore, the detection circuit 112 detects that the disk drive 30 is connected to the connector 14 and makes the CPU 11 accessible to the drive ROM 314. The CPU 11 executes the start-up program stored in the start-up program storage area 314a of the drive ROM 314. More specifically, the CPU 11 performs processing for displaying images on the basis of the model data, the texture data, the sprite data and the font data stored in the graphic data storage area 314e. For example, the CPU 11 displays letters such as "Please insert a disk". Also, the CPU 11 performs processing for generating audio on the basis of the wave data and the sequence data stored in the sound data storage area 314d. For example, the CPU 11 generates sound such as "Please insert a disk".

(3) The case where the ROM cartridge 20 is connected to the connector 13 and the disk drive 30 is connected to the connector 14;

When the power switch 101 is pushed, the detection circuit 112 instructs each of the response circuits to generate a response signal. The response circuits 22 and 312 output the response signals to the detection circuit 112. The detection circuit 112 detects that the cartridge having higher priority is connected to the connector 13 and thereby makes the CPU 11 accessible to the ROM 21. The CPU 11 executes the start-up program stored in the ROM 21. As to the priority in the above case, it is predetermined that the ROM cartridge 20 is higher priority than the magnetic disk 40, therefore, the detection circuit 112 detects the ROM cartridge 20 prior to the magnetic disk 40. Also, as another way, the detection circuit 112 may detect priority data generated from each of the response circuits and activate a storing means to which the response circuit having higher priority is connected.

Next, a principle of determining method of the present embodiment will be explained.

The storage media authorization determining method of the present embodiment is a method, when performing information processing using at least two magnetic disks (a first disk and a second disk) for the disk drive 30, to define the relation between the first disk used at first and the second disk to be used next and prohibit a use of a second disk which is not related to the first disk.

First, after the first magnetic disk is inserted to the disk drive, the CPU 11 stores a serial number, which is stored in the ID information storage area 40*a* of the magnetic disk 40, in a work area of the RAM 15. Then, after the second disk is inserted in the disk drive 30, the CPU 11 writes the serial number in the serial number storage area 40*f* of the second disk. Thus, by writing the serial number in the second disk, the first disk and the second disk store the same serial number. The CPU 11, every time the second disk is inserted, judges whether the serial number of the second disk is the same as the serial number of the first disk and when the serial number of the second disk is different from the serial number of the first disk, the CPU 11 does not access the second disk as the second disk is a false (counterfeit) disk. Accordingly, the second disk can not be used with any other disks than the determined first disk. Specifically, when a plurality of kinds of second disks are held, it is possible to prevent the use of wrong disks.

As another storage media authorization determining method, there is a method that, when performing information processing using at least one magnetic disk for the ROM cartridge 20 and the disk drive 30, defines the relation between the ROM cartridge 20 and a first disk used at first and prohibits a use of a first disk which is not related to the ROM cartridge 20.

First, after the first disk is inserted to the disk drive, the CPU 11 reads authorization determining information (not shown) stored in the ID information storage area 20*b* of the ROM cartridge 20 and writes the information into the first magnetic disk. Thus, by writing the authorization determining information into the first disk, the ROM cartridge 20 and the first disk are storing means which store the same authorization determining information. The CPU 11, every time the first disk is inserted, judges whether the authorization determining information of the first disk is the same as the authorization determining information of the ROM cartridge 20 and when both are different, the CPU 11 does not access the first disk as the first disk is a false (counterfeit) disk. Accordingly, the first disk can not be used with any other disks than the determined ROM cartridge 20. Specifically, when a plurality kinds of disks are held, it is possible to prevent a use of wrong disks.

Figure 8:
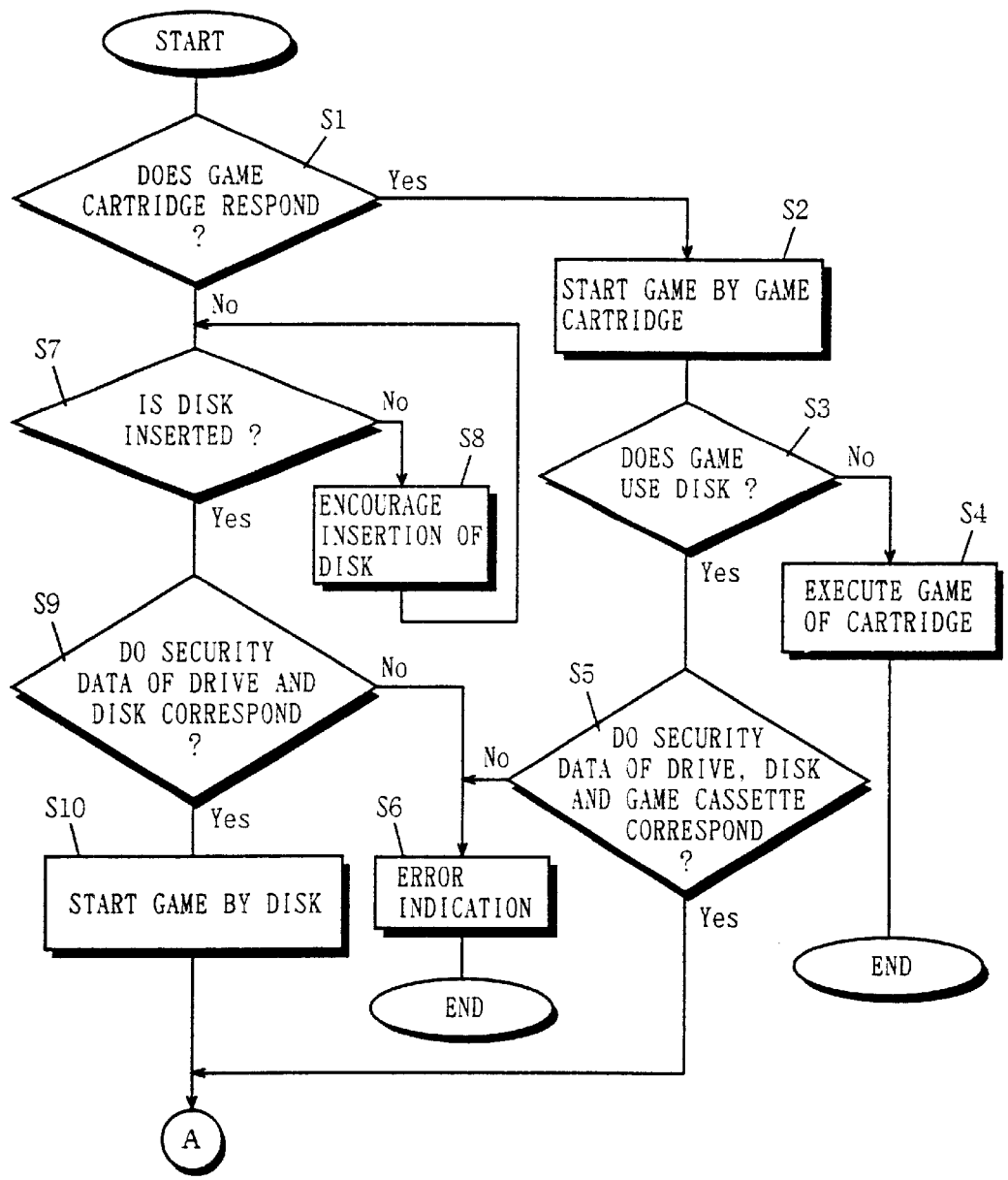
FIG. 8 is a flowchart delineating a former half of an operation according to the embodiment of the present invention.
Figure 9:
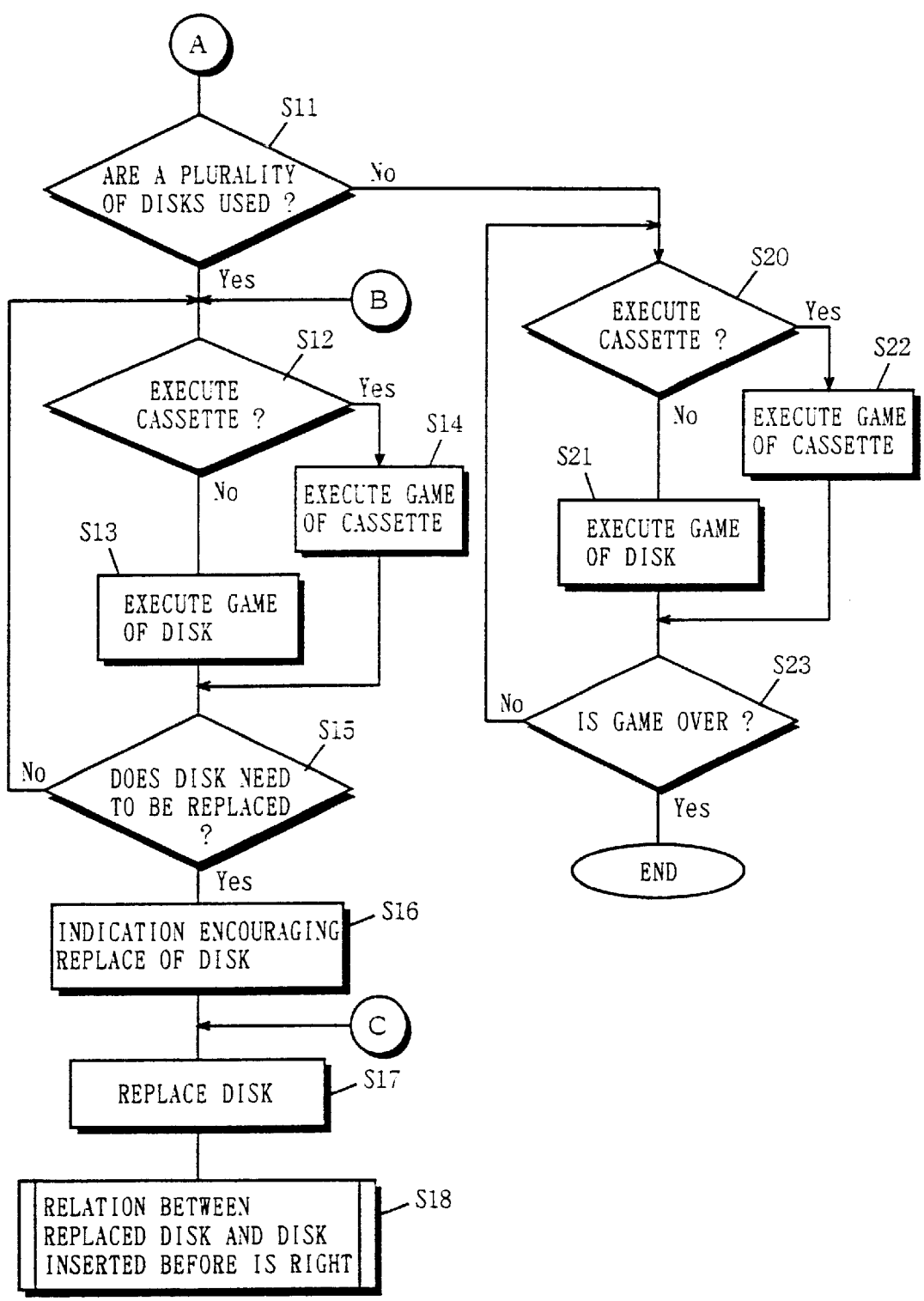
FIG. 9 is a flowchart delineating a latter half of the operation according to the embodiment of the present invention.
Figure 10:
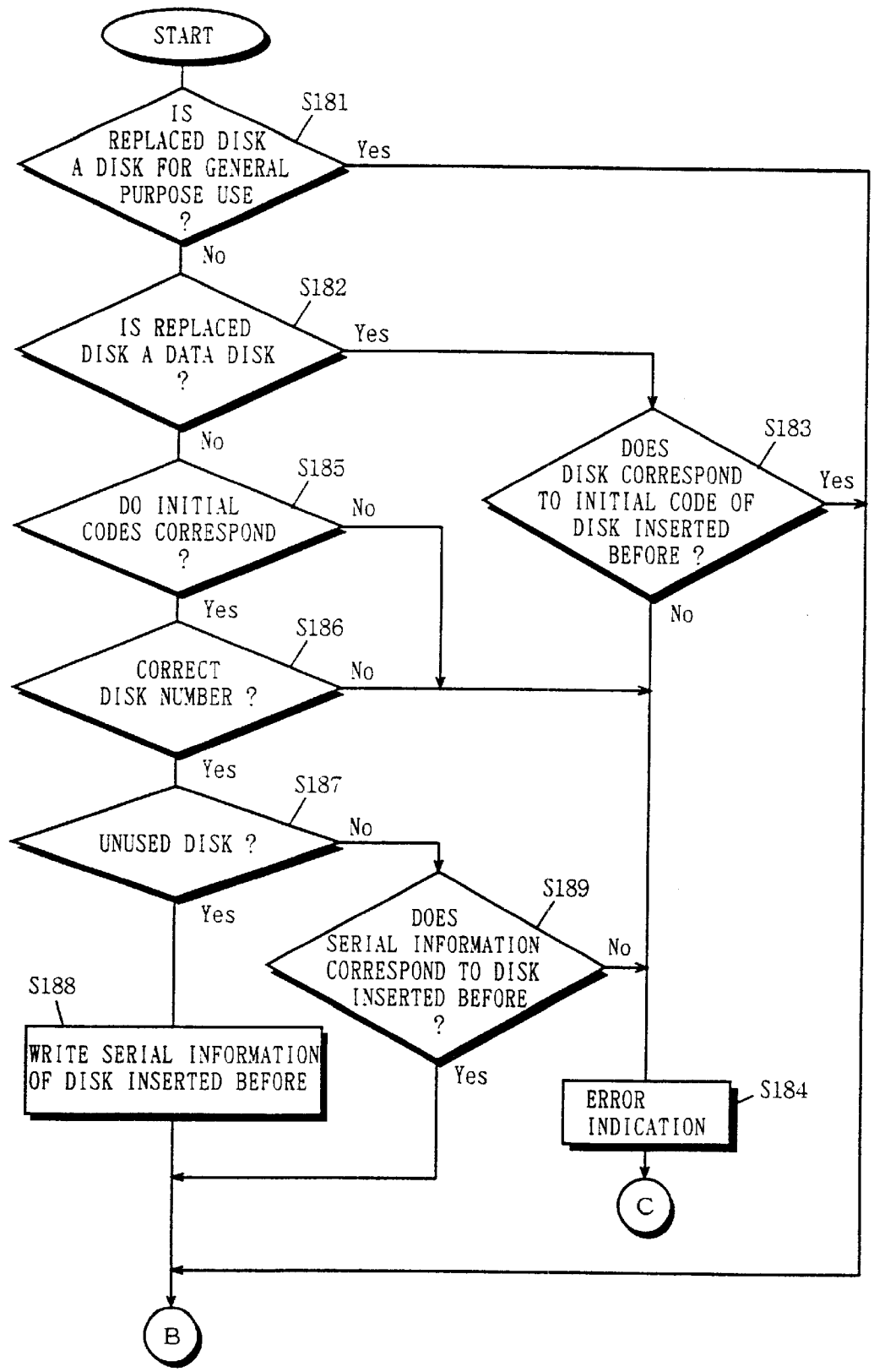
FIG. 10 is a flowchart delineating a sub-routine step 18 of the flowchart in FIG. 9 in detail.

FIG. 8–FIG. 10 are flowcharts delineating operations of the information processing system according to the present embodiment. Referring to FIG. 8–FIG. 10, the operations of the information processing system according to the present embodiment will be explained below.

First, in a Step 1 (marked with "S" in the figures) in FIG. 8, the detection circuit 112 detects whether the response circuit 22 of the ROM cartridge 20 generates a response signal including predetermined priority data. If the detection circuit 112 detects the response signal, a routine proceeds to a Step 2 and if the detection circuit 112 does not detect the response signal, the routine proceeds to a Step 7. In the Step 2, the CPU 11 starts information processing based on the startup program stored in the start-up program storage area 20*a* of the ROM 21 in the ROM cartridge 20 and executes a program based on the program stored in the program storage area 20*d*. Next, in a Step 3, if the information processing executed at present (for example, a video game) is using a magnetic disk, the routine goes to a Step 5 and if the information processing executed at present does not use a magnetic disk, the routine goes to a Step 4. In Step 4, a game program is executed based on the program stored in the program storage area 20*d* till the game program is over. In the Step 5, the CPU 11 compares the security number stored in the ID information storage area 20*b* of the ROM cartridge 20, the security number stored in the ID information storage area 314*b* of the drive ROM 314, and the security number stored in the ID information storage area 40*a* of the magnetic disk 40, and then if the security numbers are same, the routine goes to a Step 11 in FIG. 9 and if the security numbers are different, the routine goes to a Step 6. In Step 6, the CPU 11 makes the RCP 12 create image data and makes the image signal generation circuit 17 output an image signal, thereby displaying an error indication on the display 50. The error indication is a message such as "Error ???" or "Your disk is not a correct disk" to let a user know that an error occurs. After the error indication, the operation of the information processing unit 10 is ended. As another embodiment, the routine may wait till a correct magnetic disk is inserted and proceed to the Step 11 when the correct magnetic disk being inserted.

In the Step 7, the detection circuit 112 detects whether the response circuit 312 of the disk drive 30 generates a response signal including predetermined priority data. If the detection circuit 112 detects the response signal, the routine goes to a Step 9 and if the detection circuit 112 does not detect the response signal, the routine goes to a Step 8. In Step 8, the CPU 11 makes the RCP 12 create image data and makes the image signal generation circuit 17 output an image signal, thereby displaying an indication on the display 50 to instruct an insertion of the magnetic disk 40 into the slot 302. The indication is a message such as "A disk is not inserted" or "Please insert a disk". After the operation in Step 8 finishes, the routine goes back to the Step 7. In Step 9, the CPU 11 compares the security number stored in the ID information storage area 314*b* of the drive ROM 314 and the security number stored in the ID information storage area 40*a* of the magnetic disk 40, and if the security numbers are same, the routine proceeds to a Step 10 and if the security numbers are different, the routine proceeds to the Step 6. In Step 10, the CPU 11 starts information processing based on the start-up program stored in the start-up program storage area 314*a* of the drive ROM 314.

In the Steps 1 to 10, in the present embodiment, the case where the priority data output from the response circuit 22 has a higher priority over the priority data outputted from the response circuit 312 is described. However, the response circuit 312 may have a higher priority over the response circuit 22. In this case, the magnetic disk 40 starts the start-up program stored in the start-up program storage area 20*a* of the ROM cartridge 20 as number one priority. Also, in the case where the priority order is not determined, the priority data output from each of the response circuits may be compared and then a program may be started according to the start-up program stored in the storage medium in which the response circuit having a higher priority is provided.

In the Step 11 of FIG. 9, the CPU 11 determines whether a plurality of magnetic disks should be used or not based upon the program stored in the program storage area 40*c* of the magnetic disk 40. If the CPU 11 determines that the game (the information processing) uses the plurality of magnetic disks, the routine proceeds to a Step 12 and if the CPU 11 determines that the game does not use the plurality of magnetic disks, the routine proceeds to a Step 20. In the Step 12, the CPU 11 judges whether the program stored in the program storage area 20*d* in the ROM 21 of the ROM cartridge 20 should be executed based on the executed program. If the CPU 11 executes the program of the ROM cartridge 20, the routine goes to a Step 14, and if the CPU 11 does not execute the program of the ROM cartridge 20, the routine goes to a Step 13. In the Step 13, the CPU 11 executes a program based on the program stored in the program storage area 40c of the magnetic disk 40 or executes a program based on the data stored in any of the areas in the magnetic disk 40 to proceed to a Step 15. In the Step 14, the CPU 11 executes a program stored in the program storage area 20d to proceed to the Step 15. In the Step 15, the CPU 11 judges whether the magnetic disk 40 is necessary to be replaced with another magnetic disk. If the CPU 11 judges that the magnetic disk should be replaced, the routine goes to a Step 16 and if the CPU judges that the magnetic disk is not necessary to be replaced, the routine goes back to the Step 12. In the Step 16, the CPU 11 makes the display 50 display indications such as "Please change the disk". In a Step 17, the user removes the magnetic disk 40 from the slot 302 and inserts another magnetic disk 41 into the slot 302. Next, in a Step 18, the information processing system according to the present embodiment judges the relation between the replaced magnetic disk 41 and the magnetic disk 40 which was inserted before. The magnetic disk 41 includes the same storage areas as those of the magnetic disk 40. (Reference numbers of the storage areas of the magnetic disk 41 are assigned the same reference numbers of the storage areas of the magnetic disk 40, hereinafter.)

On the other hand, in the Step 20, the CPU 11 judges whether the program stored in the program storage area 20d in the ROM 21 of the ROM cartridge 20 should be executed based on the executed program. If the CPU 11 executes the program of the ROM cartridge 20, the routine goes to a Step 22 and if the CPU 11 does not execute the program of the ROM cartridge 20, the routine goes to a Step 21. In the Step 21, the CPU 11 executes a program on the basis of the program stored in the program storage area 40c of the magnetic disk 40 and the routine goes to a Step 23. In the Step 22, the CPU 11 executes the program stored in the program storage area 20d and goes to the Step 23. In the Step 23, when the program to be information processed by the CPU 11 finishes, the processing is ended and when the program to be information processed by the CPU 11 does not finish, the routine goes back to the Step 20.

The Step 18 is described by a sub-routine as shown in FIG. 10.

In a Step 181 in FIG. 10, the CPU 11 reads the use of disk stored in the ID information storage area 40a of the replaced magnetic disk 41 to judge whether the magnetic disk 41 is a data disk for general-purpose use or not. If the magnetic disk 41 is a data disk for general-purpose use, the routine returns to the Step 12 (at this time, when a format of the magnetic disk 41 is a format incapable of storing data, the format is converted to a format capable of storing data) and if the magnetic disk 41 is not a general-purpose data disk, the routine goes to a Step 182. In the Step 182, the CPU 11 reads the use of disk stored in the ID information storage area 40a of the replaced magnetic disk 41 to judge whether the magnetic disk 41 is a data disk or not. If the magnetic disk 41 is a data disk, the routine goes to a Step 183 and if the magnetic disk 41 is not a data disk, the routine goes to a Step 185. In the Step 183, the CPU 11 reads the initial code, the game version, the disk number and so on stored in the ID information storage area 40a of the replaced magnetic disk 41 to judge whether the magnetic disk 41 corresponds to the initial code stored in the magnetic disk 40. If the magnetic disk 41 corresponds to the initial code stored in the magnetic disk 40, the routine returns to the Step 12 and if the magnetic disk 41 does not correspond to the initial code stored in the magnetic disk 40, the routine proceeds to a Step 184. In the Step 184, the CPU 11 makes the RCP 12 create image data and makes the image signal generation circuit 17 output an image signal to display an indication indicating that the magnetic disk 41 is a false (counterfeit) magnetic disk on the display 50. The indication may be the same as the indication in the above-mentioned Step 6. After the indication, the routine goes back to the Step 17.

In the Step 185, the CPU 11 reads the initial code stored in the ID information storage area 40a of the replaced magnetic disk 41 to judge whether the initial code is the same as the initial code stored in the magnetic disk 40. If the initial codes of the magnetic disk 41 and the magnetic disk 40 are same, the routine proceeds to a Step 186 and if the initial codes of the magnetic disk 41 and the magnetic disk 40 are different, the routine proceeds to the Step 184. In the Step 186, the CPU 11 reads the disk number stored in the ID information storage area 40a of the replaced magnetic disk 41 to judge whether the disk number corresponds to the disk number stored in the magnetic disk 40. For example, when the disk number of the magnetic disk 40 shows a first magnetic disk and the disk number of the magnetic disk 41 shows a second magnetic disk, the disk numbers are judged to correspond. However, which number the disk number of the magnetic disk 41 should show in order to be judged that the magnetic disk 41 corresponds to the magnetic disk 40 is freely changeable depending on the executed program. If the disk numbers of the magnetic disk 41 and the magnetic disk 40 correspond, the routine proceeds to a Step 187 and if the disk numbers of the magnetic disk 41 and the magnetic disk 40 do not correspond, the routine proceeds to the Step 184. In the Step 187, the CPU 11 judges whether the magnetic disk 41 is unused or not. If the magnetic disk 41 is unused, the routine goes to a Step 188 and if the magnetic disk 41 is a used disk, the routine goes to a Step 189.

In the Step 188, the CPU 11 writes the serial number stored in the ID information storage area 40a of the magnetic disk 40 into the serial number storage area 40f of the magnetic disk 41. In the Step 189, the CPU 11 reads the serial number stored in the serial number storage area 40f of the replaced magnetic disk 41 to determine whether the serial number has the predetermined relationship to the data in the ID information storage area 40a stored in the magnetic disk 40. For example, the CPU 11 judges whether the serial number stored in the serial number storage area 40f of the magnetic disk 41 is the same as the serial number stored in the magnetic disk 40. Also, each of the data may be scrambled (or data converted based on a predetermined equation) and the CPU 11 may compare and judge the data. If the serial number stored in the magnetic disk 41 has the predetermined relationship to the data stored in the ID information storage area 40a of the magnetic disk 40, the routine returns to the Step 12 and if the serial number stored in the magnetic disk 41 does not have the predetermined relation to the data stored in the ID information storage area 40a of the magnetic disk 40, the routine goes to the Step 184.

Next, specific embodiments of information processing using a plurality kinds of storage media will be described below. (First information processing; a role-playing game using a pair of disks).

An example realizing a game, in which a hero character travels in a plurality of worlds, using the present invention will be given. Here, it is assumed that a first disk stores a program and image data of a first world, and that a second disk stores a program and image data of a second world. First, before starting the game, a serial number stored in the first disk is transcribed into a predetermined place of the second disk. After that, a user plays the game on a basis of the program and the image data stored in the first disk with writing data into the disk as necessary. After the user plays the game of the first world for some time, he/she meets a scene to move to the game of the second world. Then, a message such as "Please insert the second disk." is displayed on a display. By the user inserting the second disk, it is judged whether the second disk stores the serial number stored in the first disk and only when the second disk stores the serial number, the game of the second world is started. After that, the user plays the game of the second world with writing data into the disk as necessary.

In this way, once the first disk is played using the second disk, since the first disk and the second disk are linked, it is impossible to combine the first disk with other disks than the second disk. As a result, it is possible to prevent a combination of wrong disks from being used.

(Second information processing; a game using a cartridge version race game+an additional course data disk).

An example realizing a game to race on various courses by a variety kinds of car using the present invention will be given. First, a program and basic course data of a race game is input in a cartridge and additional course data (and/or additional kinds of car data) is input in a disk.

A user plays the game using the cartridge only. However, the user becomes tired of the game after playing all cars and all courses. Then, he/she buys the additional course data disk and inserts the disk into a disk drive and executes the disk, thereby the user can play courses (and/or kinds of cars) stored in the additional course data disk. At this time, a CPU writes true/false (authorization) determining information stored in the cartridge into the additional course data disk and makes it possible to enable the additional course data disk to be used without the cartridge.

(Third information processing; a painting game using a disk version painting tool (a first disk)+a disk for exclusive use (a second disk)+a disk for general-purpose use (a third disk)).

An example realizing a painting game, which needs to store a lot of data created by a user, using the present invention will be given. First, a program and image data of the painting game are input into a first disk and then a second disk is formatted so as to store image data.

The user inserts the first disk into a disk drive at first to execute the program of a painting tool. Next, the user executes the painting game to create images on a display freely with using a controller and a mouse. When the user wants to save the images after/during creating the images, he/she uses a function to save image data added as a function of the painting game. Specifically, the user clicks a saving icon displayed on the display using an input unit such as the controller and the mouse. Then, a message such as "Please insert a disk for saving." is displayed on the display. Therefore, the user inserts the disk, in which he/she wants to save the image data, into the disk drive. After the second disk is confirmed to be inserted into the disk drive, the image data is written into the inserted disk. If the inserted disk is not a disk for exclusive use but a third disk for general-purpose use, the third disk is formatted as a disk for exclusive use and the image data is written therein. However, in the case where the disk for general-purpose use has a format in which the image data can be written, the disk need not be newly formatted. Also, if there is enough storage area in the first disk, the image data may be written into the first disk.

As described in the above, since the image data can be written into every disk, a lot of image data can be freely stored.

(Fourth information processing; a music composing game using a disk version music tool (a first disk)+a disk for exclusive use (a second disk)+a disk for general-purpose use (a third disk))

While the third information processing is image data creating processing, the fourth information processing is music data creating processing. A method to store data in disks is almost the same as the third information processing.

Also, by checking initial codes stored in disks, it is possible to recognize disks of other corresponding tools. Accordingly, it is possible to link a disk storing image data and a disk storing music data to use. Specifically, the music data created with using the present music tool is written into the disk for painting tool of the above-described third information processing, which enable to store image data with music in the disk for painting tool. Consequently, it is possible to display animations, picture cards and so on and generate sound corresponding to the display from a speaker.

While the invention has been described in detail, the foregoing description is in all aspects illustrative and not restrictive. It is understood that numerous other modifications and variations can be devised without departing from the scope of the invention.

What is claimed is:

1. A method for operating an information processing system having at least a first slot and a second slot for respectively connecting a removable first storage device and a removable second storage device thereto, said first storage device and said second storage device each including a memory medium, said method including:

using a first storage device to store data including program data;

using a second storage device including a memory medium having a different memory access time than the memory medium included in said first storage device to store data including program data;

detecting whether the fist storage device is in the first slot and whether the second storage device is in the second slot;

operating the information processing system based on the program data stored in the first storage device when detecting that the first storage device is in the first slot and the second storage device is not in the second slot;

operating the information processing system based on the program data stored in the second storage device when detecting that the second storage device is in the second slot and the first storage device is not in the first slot; and starting operation of the information processor based on program data stored in the first storage device when detecting that the first storage device and the second storage device are simultaneously inserted in the first slot and the second slot, respectively.

2. The method of claim 1, further including using responders in the first and second storage devices to enable the detection of whether the storage devices are in their respective slots.

3. The method of claim 1, further including using a semiconductor storage device having a relatively fast access time in the first storage device; and using a storage medium in the second storage device having a relatively slow access time.

4. The method of claim 1, further including starting the information processing based on program data stored in the first storage device and then performing information processing based on data stored in the second storage device.

5. The method of claim 1, wherein one of the first storage device and the second storage device is a semiconductor storage device.

6. The method of claim 1, wherein the first storage device includes a semiconductor storage device which has a fast access time relative to the memory medium in said second storage device.

7. For use in an information processing system which comprises a first storage medium including a program storage area storing a program for information processing, a first ID data storage area storing first ID data and a first security check data storage area capable of storing security check data, a second storage medium including a data storage area storing predetermined data for information processing, a second ID data storage area storing second ID data and a second security check data storage area capable of storing security check data, and an information processing unit operating based on data stored in at least one of the first storage medium and the second storage medium, wherein said information processing system is operable to access each of said storage mediums when both storage mediums are simultaneously connected to said information processing system, a storage media authorization determining method comprising the steps of:

before using the data stored in the second storage medium for a first time, performing at least one of writing of the first ID data stored in said first storage medium into the second security check data storage area of said second storage medium and writing the second ID data stored in the second storage medium into the first security check data storage area of the first storage medium;

when performing information processing according to the program stored in the first storage medium and the predetermined data stored in the second storage medium and then using the data stored in the second storage medium again, detecting whether at least one of the second ID data is stored in the first security check data storage area of the first storage medium and whether the first ID data is stored in the second security check data storage area of the second storage medium before using the data stored in the second storage medium, and processing the data stored in the data storage area of the second storage medium when detecting that the second ID data is stored in the first security check data storage area of the first storage medium or that the first ID data is stored in the second security check data storage area of the second storage medium.

8. A method according to claim 7, further including the step of: using a semiconductor storage device having a relatively fast access time as the first storage medium.

9. A method according to claim 7, further including the step of: using a storage medium having a relatively slow access time as the first storage medium.

10. A video game machine comprising:

a video game processing system including:

a first slot for receiving a first removable storage device for storing video game data including video game program data, a second slot for receiving a second removable storage device for storing video game data including video game program data, a detector for detecting whether the first storage device is in the first slot and whether the second storage device is in the second slot;

said video game processing system being operable based on the program data stored in the first storage device when detecting that the first storage device is in the first slot and the second storage device is not in the second slot;

said video game processing system being operable based on the program data stored in the second storage device when detecting that the second storage device is in the second slot and the first storage device is not in the first slot; and wherein said video game processing system is operable to start operation based on program data stored in the first storage device in response to detecting that the first storage device and the second storage device are simultaneously inserted in the first slot and the second slot, respectively.

11. A video game system according to claim 10, wherein one of the first storage device and the second storage device is a semiconductor storage device.

12. A video game system according to claim 10, wherein the first storage device includes a storage device which has a fast access time relative to the memory medium in said second storage device.

* * * * *

UNITED STATES PATENT AND TRADEMARK OFFICE
CERTIFICATE OF CORRECTION

PATENT NO.     : 6,453,379 B2
DATED          : September 17, 2002
INVENTOR(S)    : Nishiumi et al.

It is certified that error appears in the above-identified patent and that said Letters Patent is hereby corrected as shown below:

<u>Title page, Item [54] and Column 1, lines 1-3,</u>
Change "INFORMATION PROCESSING SYSTEM AND TRUE/FALSE DETERMINING METHOD USED THEREFOR" to -- INFORMATION PROCESSING SYSTEM AND STORAGE MEDIA AUTHORIZATION METHOD USED THEREFOR --.

Signed and Sealed this

Twenty-fourth Day of December, 2002

JAMES E. ROGAN
*Director of the United States Patent and Trademark Office*